Patented June 3, 1924.

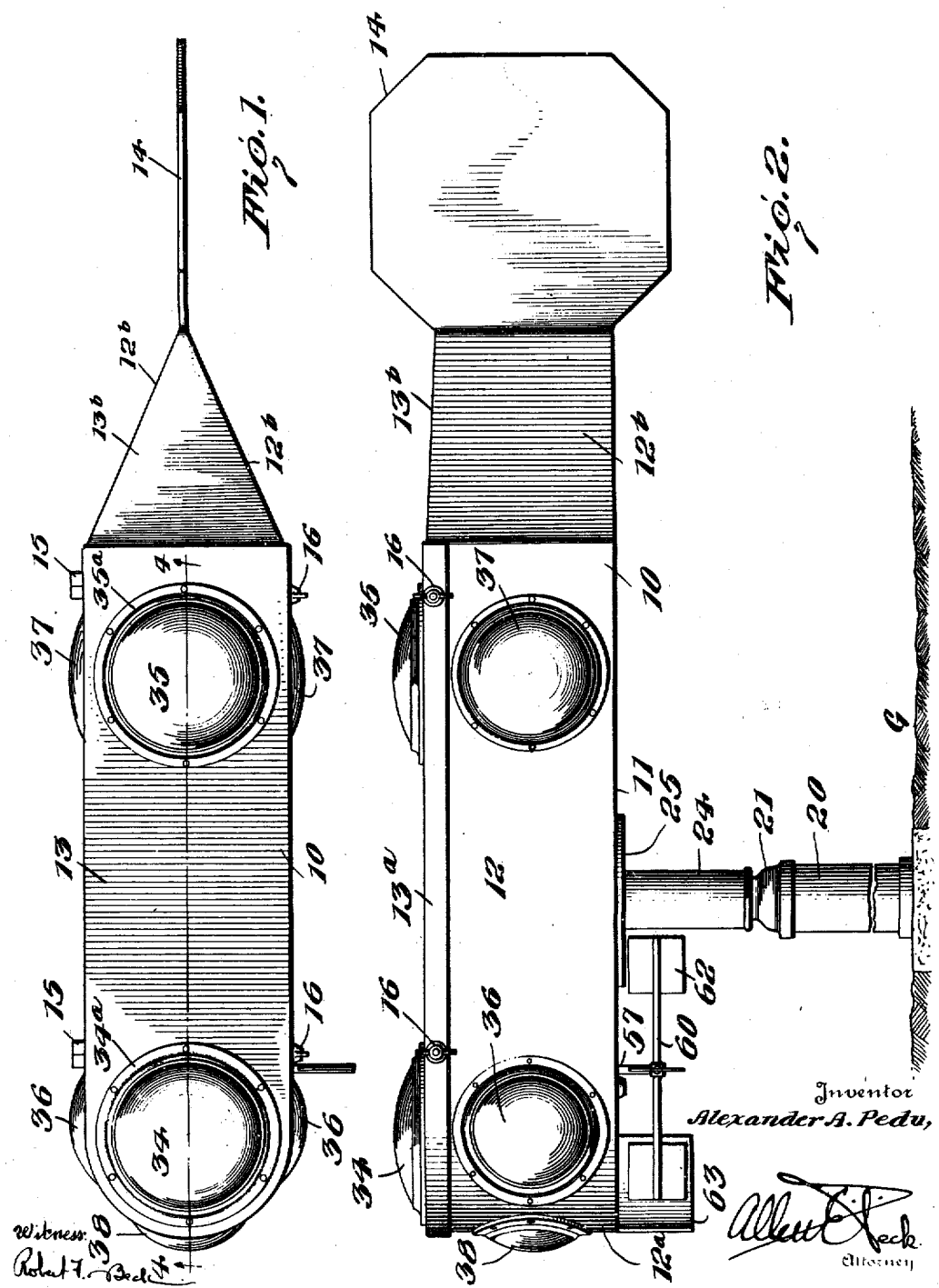

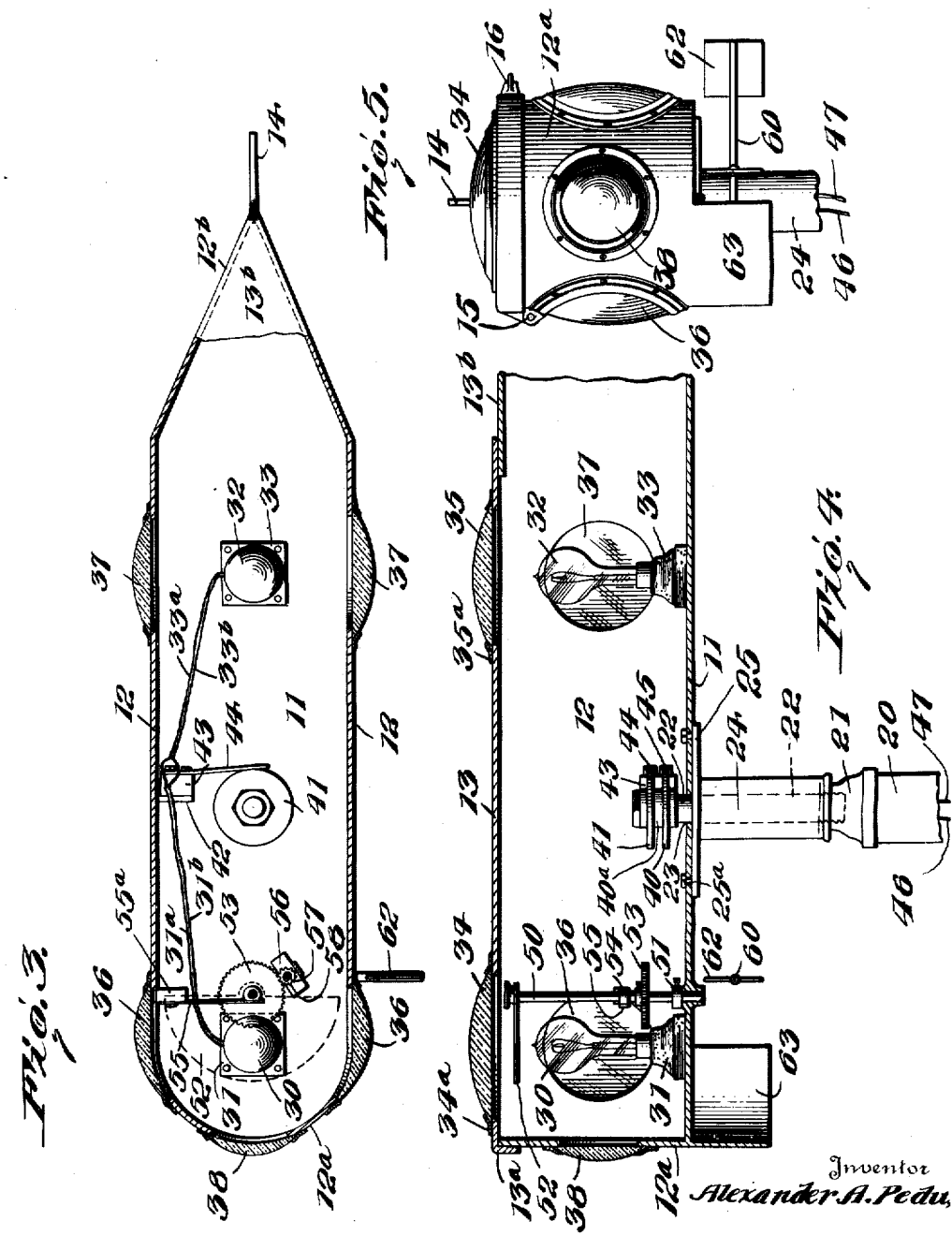

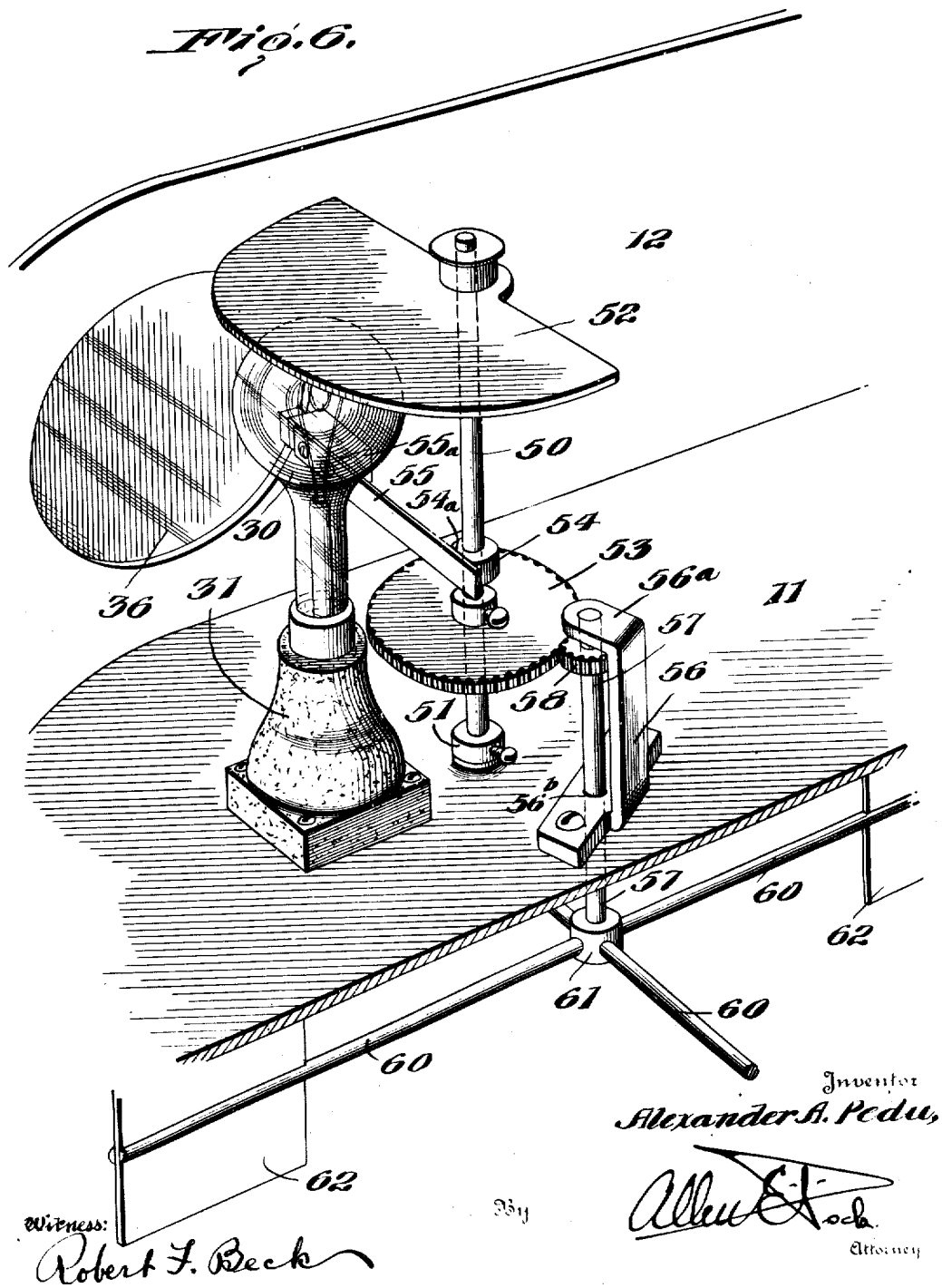

1,496,486

UNITED STATES PATENT OFFICE.

ALEXANDER A. PEDU, OF LONG ISLAND CITY, NEW YORK.

MEANS FOR INDICATING THE DIRECTION AND VELOCITY OF WINDS.

Application filed November 18, 1921. Serial No. 516,103.

*To all whom it may concern:*

Be it known that I, ALEXANDER A. PEDU, a citizen of the Republic of France, and resident of Long Island City, county of Queens, State of New York, have invented certain new and useful Improvements in and Relating to Means for Indicating the Direction and Velocity of Winds, of which the following is a specification.

This invention relates to means for indicating the direction and velocity of winds; and the nature and objects of the invention will be readily understood by those skilled in this art in the light of the following explanation and detailed description of the accompanying drawings, illustrating what I at present consider to be the preferred embodiments or mechanical expressions of my invention from among various other forms, arrangements, combinations and constructions within the spirit and scope thereof.

The present invention provides means automatically operated by the winds or air currents within the area or at the point in which the said means is located, for visibly indicating the direction and velocity of the winds or currents within such area or at such point, and which indicating means is visible and can be read at considerable distances therefrom, so that, information as to the direction and velocity of the prevailing winds in an area or at a certain point can be visually determined from points located at considerable distances therefrom. Although the indicating means of the invention is adapted to various uses and applications for visibly indicating the direction and velocity of the prevailing winds in the area in which it is located, it is particularly intended and adapted for use in connection with the operation of air craft and in the solution of certain peculiar problems which arise in the operation of such craft with respect to the condition or state of the prevailing ground or surface winds.

In the use and operation of aircraft, and particularly in the operation of all heavier than air types both land and water, which are herein referred to generally as airplanes, it is essential to proper, efficient and safe piloting thereof that pilots be at all times informed and aware of the direction and velocity of the ground or surface winds when "taking off" and landing, as well as in performing other manœuvers and in the general flight navigation of aircraft. Those familiar with and skilled in the piloting and operation of aircraft are aware of the fact, as well as the reasons therefor, that wherever possible all landings and departures are made into, that is against or in the direction of, the prevailing ground or surface winds, and are further aware that it is exceedingly hazardous to depart or land across, with, or in any other direction or angle to the direction of the prevailing wind. Particularly is this latter fact true when a pilot makes such a landing or departure without being aware of the same, and hence unprepared to properly meet and cope with the conditions developed by such a situation until too late to make a recovery and avoid the possibility of accident with the resulting loss.

However, even though a pilot has been informed and is aware of the direction of the prevailing ground or surface winds, there is another condition or state of the wind which has an important and controlling effect upon the craft in landing or departing and upon the manner in which the same must be handled or piloted in making the landing or departure. This condition or state of the prevailing ground or surface wind is, the rate of speed or velocity thereof, and if this condition of the wind can be ascertained or determined by a pilot before making a landing or taking off, it is of material aid and reduces the uncertainties and hazards of landing and taking off to a minimum.

Various means are employed at present in the operation of aircraft, airports and landing fields for the purpose of informing pilots of the general direction of the prevailing ground or surface winds, and those in universal use consist of a "stocking" or conical cloth pennant, such as used at the mast heads of ships, which "stocking" is mounted on a flag pole or similar mounting so as to lie in and indicate the general direction of the prevailing wind; and the use of a so-called "landing T" placed upon the ground and visible from the air to indicate the general direction of the prevailing wind at that point. The use of the "stocking" or similar cloth pennant is unsatisfactory due to the fact that it is only visible at low altitudes and even then is very deceptive and difficult to read, and is invisible at night and hence without utility in night flying. The results from the use of the "landing T" are very unreliable, because such a device must be manually or otherwise reset or corrected with each change of wind direction, is very inaccurate in only giving the general wind direction, and depends entirely upon the ground personnel for its care, operation and effect, it being necessary for the ground personnel to watch for and observe changes in the wind and to then correct the position of the T in accordance therewith, which wind changes are very frequently unobserved or unheeded through carelessness or oversight of the ground personnel and the T remains unchanged, thus misinforming pilots relying thereon, and frequently causing serious and costly accidents. Further, in the use of such "landing T's" there is the very objectionable interval of elapsed time between a change in wind direction and the actual change in a T to corrected position by the ground personnel, so that, during such interval of time the T is incorrectly positioned and will misinform pilots in the air relying thereon in making landings, or otherwise relying thereon for the direction of the ground or surface winds.

With the prevailing methods and devices now known and in use for informing and advising pilots of the general direction of the prevailing ground or surface winds there is no manner of or provision made for indicating to or informing a pilot of the velocity of the ground or surface winds, so that pilots must make landings and navigate their craft in ignorance of this essential and important condition or state of the wind, except in so far as, they may assume or deduce the velocity of the wind from the appearance of such objects as trees, smoke or the like, on the ground which are effected by the wind, and by the general behavior and feel of their craft in flight. However, experience has shown that in practice, such assumptions and deductions are not accurate or of material aid, and that the problem of accurately informing and advising pilots of the velocity of the ground or surface winds is not solved thereby. Hence, one of the main objects of the present invention is to solve this problem by the provision of means for and a method of visually indicating to and accurately informing pilots of the velocity of the prevailing ground or surface winds, as well as to accurately indicate and inform pilots of the direction of such winds.

A further object of this invention is to provide means for visually indicating to the pilots of aircraft in flight, the velocity and the direction of the prevailing ground or surface winds within the area in which the means is located, and which will visually indicate the velocity and direction of the winds continuously and at all times, both during the day and at night, to aircraft at considerable altitudes thereabove and for a considerable area therearound.

A further object of this invention is the provision of means for visually indicating to aircraft in flight the velocity and direction of the prevailing ground or surface winds, and which means is continuously and automatically operated and accurately controlled by the action and state of the winds within the area in which the means is located and operatively mounted.

A further object of this invention is to provide a method of visually indicating the velocity and direction of the prevailing ground or surface winds within an area at all times and continuously both during the day and at night, through the employment of which it is possible to inform and advise the pilots of aircraft in flight at considerable altitudes above and for considerable distances around such area of the condition and state of the prevailing ground or surface winds.

A further object of this invention is to provide a device adapted to visually indicate the velocity and direction of the wind by means of a construction and arrangement of elements having different appeals to and effects upon the vision of an observer, which elements are controlled and operated by the wind or air currents within the area in which it is located, and which are visible at considerable distances therefrom and therearound and may be readily interpreted to determine the velocity and direction of the winds or air currents controlling and operating the same.

A further object of this invention is to overcome certain of the hazards and solve certain of the problems attendant the operation of aircraft both during the day and night and particularly the landing and departures thereof, on and from landing fields, airports, and such like, by the provision of means adapted to be operatively mounted at landing fields, airports and along the main air lines utilized by aircraft, to visually indicate to the pilots of aircraft in flight, up to considerable altitudes and for considerable distances around the location of such means, the direction and velocity of the ground or surface winds, and which means is automatically and continuously operated by the winds or air currents in the area in which the same may be located and mounted without depending upon or requiring the attention of ground personnel.

A still further object of the invention is to provide certain novel constructions, arrangements and combinations in means for visually indicating the direction and velocity of winds or air currents, through the medium of which certain new results, uses and applications of such indicating means are created and several problems in the art of flight, air navigation and the operation of aircraft are solved.

With the foregoing and various other objects in view, which will be readily apparent to and appreciated by those skilled in the arts involved, my invention consists in certain novel features in constructions and arrangements as more fully and particularly set forth and specified hereinafter.

Referring to the accompanying drawings:

Fig. 1 is a top plan view of a device embodying features of the present invention.

Fig. 2 is a side elevation of the device of Fig. 1, showing the mounting therefor.

Fig. 3 is a top plan view with the cover of the device removed, parts thereof broken away and other parts in section, and particularly showing the mounting and arrangement of the wind velocity indicating means and the arrangement of lights with the circuits therefor.

Fig. 4 is a longitudinal vertical section taken on the line 4—4 of Fig. 1.

Fig. 5 is a front elevation showing a portion of the propelling mechanism for the wind velocity indicating means.

Fig. 6 is a perspective view of the wind velocity indicating mechanism and the mounting and arrangement thereof within the body of the direction indicating means, a portion of which is shown.

In the accompanying drawings I have illustrated and have hereinafter described, one form and embodiment of the present invention particularly adapted and applicable for use in connection with the operation of aircraft and of landing fields, air ports and along airways utilized thereby, to visually indicate to the pilots of aircraft the direction and velocity of the prevailing ground or surface winds. However, it is to be understood that there is no intention or desire to limit the invention to the particular application and embodiment thereof illustrated and described by way of example herewith, as the invention is capable of other applications and uses for visually indicating the direction and velocity of winds, air currents or other fluids, and of the forms, embodiments and constructions necessary to meet the requirements of such applications and uses.

The illustrated form and embodiment developed for the particular application and use referred to herein by way of an example of the invention, comprises an elongated, substantially rectangular hollow body member 10 pivotally mounted for rotation upon and around a suitable base or support, such as the fixed column or mast 20, and sensitive or responsive to the winds or air currents acting thereon, so as to rotate or swing in response to changes in the direction of the prevailing winds or air currents. This elongated wind responsive body member 10 is formed by a casing or housing comprising a bottom or floor 11 having opposite side walls 12 extending upwardly therefrom, and a top or cover 13 providing a tight weather proof closure for the housing. The nose or forward end 12$^a$ of the body member or housing 10 is suitably rounded or curved to reduce head resistance and to decrease the pressure surface presented to the winds and air currents acting thereagainst in operation. The tail or rear end portion of the body member 10 is gradually decreased in width rearwardly by the opposite inwardly inclined portions 12$^b$ of the sides 12, which converge and terminate in a rearwardly extending vertically disposed fin or tail 14 of relatively large surface area. The cover or closure 13 is mounted and secured along one side of the housing 10 for vertical swinging movement to and from closed position thereon by means of the pivots or hinge members 15, and along the opposite, free edge of the cover 13, wing nuts 16 are provided for securely clamping the cover 13 in closed position onto the housing or body member 10. It will be noted that the cover 13 is formed with depending flange 13$^a$ extending therearound and forming a protective strip against the entry of rain, snow, ice and such like foreign matter into the housing between the upper edges of the walls 12 and the cover 13, with the latter in-closed position thereon. The cover 13 extends to and terminates at the forward end of the converged rear sides 12$^b$ of the housing and this rear portion of the housing is provided with a fixed upper wall 13$^b$ extending thereacross and completely covering and closing the rear end portion of the housing. The rear end of the cover 13 extends a distance onto and over the upper wall 13$^b$ to prevent entry of foreign matter into the interior of the housing (see Fig. 4), and the wall 13$^b$ is slightly sloped downwardly and rearwardly toward the tail 14 to quickly drain off rain, snow and such like therefrom and avoid the entry thereof under the cover 13.

The body member or housing 10 is provided with any suitable or desired source of light or illumination mounted and confined therein, and in the present instance comprises an electric lamp 30 mounted in a socket 31 secured on the bottom or floor 11 at the forward or nose end of the housing, and an electric lamp 32 mounted in a socket 33 secured on the floor or bottom 11 at the rear or tail portion of the housing, respectively. The rear lamp 32 is located at a point below the rear end portion of the cover 13 and forwardly of the wall 13$^b$ of the housing or body member 10. The cover 13 is formed with forward and rear openings therethrough directly above and in line with the forward and rear lamps 30 and 32, respectively, and lenses 34 and 35 are mounted over and close the forward and rear openings through the cover 13 and directly above the respective lamps 30 and 32, within the body member 10. The lenses 34 and 35 are tightly secured to the cover 13, over and covering the openings therethrough, by the bezels or rings 34ª and 35ª, respectively, so that a weather proof joint is formed and the openings through the cover 13 are closed against entry of rain, snow and such like. Preferably, the lenses 34 and 35 are of the Fresnel type, and of contrasting colors, the lens 34 being red and the lens 35 being green, in the present instance, although any other suitable contrasting colors may be used. In order to more clearly emphasize and distinguish between the contrasting colored lenses 34 and 35, the exposed top surface of the housing or body member 10, formed by the cover 13 and wall 13ᵇ, is so prepared as to present a background against which the colored forward and rear lenses 34 and 35 mounted therein and thereon will sharply and clearly stand out and be readily distinguished and interpreted at considerable distances from the body member 10. For example, the top surface of the body member 10 may be colored white to present the required background for the colored lenses, although any desired color may be utilized to produce the maximum contrast and effect between the top surface and the lenses mounted thereon.

The opposite sides of the housing or body member 10 may be provided with an arrangement of contrastingly colored lenses similar to the top lenses 34 and 35, and adapted to be illuminated by the lamps 30 and 32 mounted within the housing. In the present instance, each side 12 is provided with a forward lens 36 opposite the forward lamp 30, and a rear lens 37 opposite the rear lamp 32, so as to be illuminated thereby, and these opposite side lenses 36 and 37, respectively, are mounted and secured tightly over and close openings formed through the opposite sides 12, in the same manner as that hereinbefore described with respect to the mounting and securing of the top lenses 34 and 35, in the cover 13. The lenses 36 and 37 mounted on each side 12 of the housing are of the same contrasting colors as the top lenses 34 and 35, and are arranged in the same relative position thereon with respect to the nose and tail of the body member 10, that is, the forward side lenses 36 are red and the rear side lenses 37 are green. The front or nose 12ª of the housing or body member 10 is provided with a red lens 38 mounted over an opening formed therein, in the same manner as the various other lenses, for illumination by the forward lamp 30, and if desired, although not deemed necessary to illustrate the same herewith, suitable green lenses may be mounted on the rear or tail end of the body member 10, for example on the opposite inwardly inclined and converging rear side portions 12ᵇ thereof.

The body member 10 constructed and provided with the arrangement of various colored lenses with the source of illumination therefor as described above, is rotatably mounted on a suitable elevated base for swinging movement thereon, and therearound in response to the changes in direction of the winds or air currents acting thereon, and forms the means for indicating the direction of the prevailing winds in the area in which it is mounted. The body member 10 is preferably mounted in an elevated position exposed to the full and true force and direction of the prevailing winds, above all buildings and other obstructions on the ground and free from the influence of and uneffected by any cross currents, eddies or the like created by such buildings or other ground obstructions. In the accompanying drawings, I show one form of elevated base arrangement for mounting the body member 10, thereon, which consists of a vertically disposed hollow mast 20 securely fixed on the ground G (see Fig. 2) and extending to the desired elevation. The upper end of the mast 20 is provided with a flanged cap 21 having a reduced upper end portion forming an annular shoulder therearound, and a hollow shaft 22 is rigidly screw threaded or otherwise secured in and to the upper end of the cap 21 and extends upwardly therefrom in longitudinal alinement with and continuation of the mast 20. The housing or body member 10 is provided with a circular opening 23 through the forward portion of the floor or under side 11 thereof and located equidistant from the opposite sides of the body member 10, that is, the opening 23 is located at a point forwardly of the transverse center of the body member 10 and along the longitudinal axis thereof. A sleeve 24 having an end flange 25 is secured to the under side of the floor 11 of the body member 10 and alined with and surrounding the opening 23 therethrough. The sleeve 24 is rigidly fixed to and secured in position extending outwardly from the under or lower side of the body member 10 in alinement with the opening 23 by the bolts or the like 25ª passing through the floor 11 and engaging the upper end flange 25 of the sleeve 24. The body member 10 is rotatably mounted on the upper end of the mast 20 by the sleeve 24 which fits down over and receives the fixed shaft 22, with the lower end of the sleeve 24 fitting over the reduced end of the cap 21 and forming the lower bearing point of the body member 10 in mounted position on the mast. Preferably, any suitable or other desired antifriction bearing, such as the usual ball bearing (not shown) is provided between the lower end of the sleeve 24 and the cap 21, upon which the sleeve rotates in operation. The fixed shaft 22 extends through the opening 23 in the floor bottom 11 a distance within the housing or body member 10, and the opening 23 is preferably of a diameter equal to the exterior diameter of the fixed shaft 22, so that, an upper bearing or journal is formed for the rotatable sleeve and body member 10 secured thereon. Thus from the foregoing it is apparent that the body member or housing 10 is rotatably mounted by means of the sleeve 24 on the fixed shaft 22 on the upper end of the mast 20, and that the body member 10 is freely swingable on the mast around the fixed shaft 22 thereof as an axis.

The electrical sockets 31 and 33 with the lamps 30 and 32, respectively, mounted within the body member 10 for illuminating the various lenses thereof, are connected with any suitable or desired source of electrical energy (not shown) in the following manner. The length of the fixed shaft 22 which extends within the body member 10 is provided with the spaced contact disks 40 and 41, which are formed of electrical conducting material and are fixed on the innermost end of the shaft 22 and insulated from each other and from the shaft 22 by means of any suitable insulating material 40ᵃ. One side 12 of the housing is formed with an inwardly projecting lug 42 adjacent the opening 23 in the floor 11 of the housing and extending inwardly toward the shaft 22 with the fixed upper and lower disks thereon. An insulating block 43 is secured onto one side of the projecting lug 42, in the present instance the rear side thereof, and a pair of spaced resilient contact arms or brushes 44 and 45 are secured thereto and insulated from each other thereby. The resilient brushes 44 and 45 extend inwardly toward the spaced upper and lower disks 41 and 40, and are so arranged as to slidably bear and press upon the peripheries thereof and form continuous electrical contact therewith, respectively. Electrical conductors or cables 46 and 47, from any suitable source of electrical energy (not shown), extend and pass upwardly through the hollow mast 20 and the longitudinal bore of the fixed shaft 22, to the spaced disks 40 and 41 with which they are electrically connected, respectively.

The terminals of the socket 31 are connected with the brushes 44 and 45, by the insulated wires 31ᵃ and 31ᵇ, respectively; and the terminals of the socket 33 are connected with the brushes 44 and 45, by the insulated wires 33ᵃ and 33ᵇ, respectively. The foregoing electrical circuits are more or less diagrammatically illustrated in the accompanying drawings, see particularly Fig. 3, and it will be seen that current passes by the cables 46 and 47 to the disks 40 and 41; from the disks 40 and 41 to the brushes 45 and 46 respectively, which are continuously in electrical contact and connection therewith; and by the wires 31—31ᵇ to the socket 31 and lamp 30, and by wires 33ᵃ—33ᵇ to the socket 33 and lamp 32. In operation, the body member 10 is freely rotatable on and around the fixed shaft 22 and swings in response to the changes in direction of the wind, but the circuits to the lamps are maintained closed and the lamps lighted continuously by the brushes 44 and 45 bearing against and slidable around the peripheries of the fixed disks 41, 40 in contact therewith, as the body member swings or rotates in response to wind direction changes, thus avoiding twisting and breakage of the supply cables 46 and 47 which remain in fixed position within the mast 20 and shaft 22, undisturbed by the movement of the body member 10 within which the lamps 30 and 32 are mounted and electrically connected and supplied with current from the supply cables through the arrangement of fixed disks and brushes movable therearound in contact therewith.

The means for visually indicating the velocity of the winds or air currents is operatively mounted on and in operative relation with the hereinbefore described direction indicating body member 10 and illuminated lenses therefor. A vertically disposed shaft 50 is mounted within the housing or body member 10 to the rear of and adjacent the forward socket 31 and lamp 30, in a suitable bearing 51, preferably of the antifriction ball type, positioned in and on the floor 11 of the body member 10. An opaque shutter 52 in the present instance approximately semi-circular in shape or outline, is fixed to and mounted on the upper free end of the shaft 50 at the central point of the straight edge side thereof, and rotatable with the shaft 50. The shutter 52 is so arranged with respect to the lamp 30 that in forward position it extends completely over and across the lamp 30, and lies between the lamp and the red lens 34 thereabove, while in position extending rearwardly from the shaft 50, it is completely withdrawn from the lamp 30 and exposes the lens 34 thereto. At a point intermediate the bearing 51 and shutter 52 the shaft 50 is provided with a gear 53 mounted and fixed to rotate therewith, and a distance above the gear 53 a collar 54 having a flat side portion or face 54ᵃ, is fixed to the shaft 50 for rotation therewith. A flat, resilient arm 55 is secured at one end to a lug 55ª projecting from a side wall 12 of the housing, and extends therefrom in line with and bearing against the side of the collar 54 at its free extended end. A bearing bracket or support 56 is mounted on the floor or bottom 11 of the body member 10, to one side of and adjacent the shaft 50 and gear 53, and provides upper and lower alined bearings 56ª, and 56ᵇ, respectively. A vertically disposed shaft 57 is rotatably journaled in the bearings 56ª and 56ᵇ of the bearing bracket 56, and this shaft 56 extends through a bore in the floor 11 and a distance therebeyond outside of the body member or housing 10. The upper end of the shaft 57 is provided with the pinion 58 fixed thereto and meshing with the gear 53 of the shaft 50, so that rotation of the shaft 57 causes rotation of the shaft 50 and shutter 52 fixed thereon, through the enmeshed pinion and gear 58 and 53, respectively. In the present instance, the ratio between pinion 58 and gear 53, is ten to one, with the result that, for every ten revolutions of the shaft 57 and pinion 58, the shutter 52 makes one complete revolution; through approximately one half of which it lies between the lamp 30 and lens 34 and completely cuts off or darkens said lens. The continued rotation of the shutter 52 on the shaft 51 causes an alternate darkening and illumination of the lens 34 to produce a "blinking" effect from the lens 34 when viewed from the exterior of the body member 10.

The propelling mechanism for the shaft 57 and the shutter 52, through the arrangement of gears and shafts described, comprises an arrangement of vanes or blades mounted on and fixed to the outer end of the shaft 57, exposed to and actuated or rotated by the winds or air currents acting thereon and thereagainst. A series of arms 60 are mounted in a collar or hub 61 secured on and fixed to the outer exposed end of the shaft 57, and these arms 60 extend radially from and spaced equidistant around the hub 61 and shaft 57. The outer free ends of the radial arms 60 are provided, in this instance, with flat blades or vanes 62, so arranged thereon as to present their flat extended surfaces to the action of the winds or air currents to which they are exposed, in operation. In order to cause rotation of the arms 60 and shaft 57 in but one direction, and to relieve and overcome any back pressure or retarding effect on the blades or vanes 62 in rotating against the direction of the wind acting thereagainst, a shield or deflector 63 is provided at the forward or nose end of the body member 10 and protecting approximately one half of the path or area in which the blades 62 rotate, so that the arms 60 with the blades 62 are exposed through approximately one half of their path of rotation and in moving forwardly against the direction of the wind acting on the exposed blades, are protected therefrom by the shield or deflector 63. The deflector 63 depends downwardly from the curved nose end 12ª, of the body member 10, and in the present instance, extends from the vertical center line of the nose end and curves rearwardly around and a distance along one side of the body member 10 to prevent the retarding action of the winds or currents against the blades 62 from the front and side on which the deflector is located in rotating forward toward and against the direction of the winds or air currents. The foregoing is true due to the fact that the body member 10 always lies with the forward or nose end thereof pointed toward and lying in the direction of the prevailing winds, so that the blades 62 extending from the unobstructed side of the forward or nose end of the body member 10 are exposed to and forced raerwardly to cause rotation of the shaft 57 on which they are fixed.

In operation, the body member or housing 10 forming the wind direction indicating means is rotatably mounted on the upper end of the mast 20 and swingable around and on the fixed shaft 22 as an axis, in response to the changes in direction of the prevailing winds or air currents acting thereon. The body member 10 always lies in and points toward the direction of the prevailing winds, and is responsive to and changes in accordance therewith, due to the pivotal point or axis on which it swings being forward of the center of the body member, thus presenting a greater rearwardly extending surface than forwardly extending surface, so that the wind pressure is greatest on the rear surfaces and maintains the body member in line with the direction of the wind acting thereon and thereagainst. The rear surface is materially increased and the body member made more sensitive and positive in response to changes in wind direction, as well as steadier in operation, by the addition to the rear end of the body member, of the relatively large tail or fin 14, which materially increases the area of the rear pressure surfaces and decreases objectionable oscillation or swinging of the body in operation. The arrangement of the rotatable mountings and bearings on which the body member swings provides for very sensitive and accurate responses to the changes in direction of the winds, even when no more than very light air currents. The lamps 30 and 32 within the body member 10 are maintained continuously lighted and the various lenses in the body member are illuminated thereby.

The continuous lighting of the lamps 30 and 32 is provided for and made possible during all swinging movement of the body member through the fixed disks 40 and 41 on the shaft 22, and the brushes 44 and 45 carried by the swinging body member 10 and slidably and electrically contacting with the fixed disks. The flat top surface of the body member 10 with the contractingly colored illuminated forward and rearward lens 34 and 35, is clearly and distinctly visible by the pilots of aircraft up to considerable altitudes, and by the direction in which it lies and points will indicate the direction of the ground winds in the area in which it is mounted. Pilots will be advised and know the contrasting colors of the lenses employed, such as the forward red lens 34 and the rear green lens 35 of the present disclosure, and may therefore determine and interpret thereby the direction in which the body member or indicator lies, in the event that said body member of the top surface thereof is not visible, as at night, during poor visibility or for various other reasons, by means of the illuminated lenses which will be alined in the direction of the prevailing wind with the red lens at the front or nose end of the indicator body and the green lens at the rear or tail end of the indicator body. Therefore, in making a landing, a pilot will know, that in order to land into the prevailing wind he must head down toward the green or rear lens and then aline the red or forward lens therewith, maintaining the green lens alined between his craft and the forward red lens. The top lenses 34 and 35 are so constructed and arranged that they each have a relatively large cone of dispersion, that is they are visible for a considerable distance around and from the indicator body within an area defined by a circle of which each lens is the center. In this manner the illuminated lenses are visible from all sides of and at considerable altitudes and distances laterally therefrom. For example, the lenses 34 and 35 may have a cone of dispersion 60°. The side lenses 36 and 37, as well as the front or nose lens 38 and any rear lenses (not shown), if utilized, are visible from the ground and will indicate to persons or to the pilots of aircraft in taking off, particularly at night, the direction of the prevailing wind. Further, these side lenses are visible to pilots and will indicate the direction of the wind, in the event of extremely low flight with respect to the elevation of the indicator body member 10, in the same manner as described with respect to the top lenses 34 and 35.

The velocity of the winds or air currents is indicated to pilots by means of the rotating or revolving shutter 52 and the propelling mechanism therefor. As pointed out, the indicator body member 10 always lies in and points toward the direction of the winds or air currents acting thereon, so that, the vanes or blades 62 of the wind velocity indicating means, which blades are located at the forward or nose portion of the indicator body, will lie in the direct path of the wind and exposed to the full force and effect thereof. However, due to the shield or deflector 63 protecting one side of the path of the vanes 62, only those vanes in the exposed section of the path of rotation will be acted upon and effected by the wind, with the result that the vanes will be rotated in one direction with and around the shaft 57 as an axis by the wind acting on and forcing the exposed vanes rearwardly in the path and direction of flow of the wind, the vanes rotating forwardly against the wind being protected therefrom and uneffected thereby due to the deflector 63. Thus, rotation of vanes 62 and shaft 57 by the direct true force of the winds is secured, at a rate of rotation directly related to and depending upon the velocity or rate of speed of the wind. The rotation of the shaft 57 by the vanes 62 causes rotation of the shaft 50, through the enmeshed pinion 58 and gear 53, and the rotation of the shaft 50 rotates or revolves the opaque shutter 52, mounted on and fixed to the upper end portion thereof, between the lamp 30 and the forward red lens 34 illuminated thereby. The shutter 52 cuts off or darkens the lens 34 during approximately half of a revolution thereof and during the remainder of a revolution is withdrawn from the lamp 30 and the lens 34 is illuminated, so that during rotation of the shutter 52 the lens 34 is alternately dark and illuminated, the effect of which is to give the red lens 34 an appearance of flashing or blinking. The rate of rotation of the shutter 52, or the rapidity of the flashes or blinks imparted to the lens 34 thereby, is directly proportional to the rate of speed or velocity of the prevailing winds acting upon and rotating the vanes 62, so that the greater velocity of the prevailing winds, the greater the rapidity with which the red or forward lens 34 flashes or blinks, and the lower the velocity of the winds the slower the rate at which the lens 34 flashes or blinks.

It will be apparent from the foregoing description that the velocity indicating means is continuously operated by the prevailing winds and that the lens 34 flashes or blinks continuously, the lamp 30 being lighted at all times, hence the pilots of aircraft can readily determine the velocity of the prevailing winds by the rate at which the red or forward lens 34 is flashed or blinked.

In the event that there is no wind and no air currents are stirring, the pilot will be advised of this fact by the forward red lens 34 being darkened, due to an arrangement which causes the shutter to always stop or come to rest interposed between lamp 30 and lens 34. This is obtained by the arrangement of collar 54 fixed to and rotating with the shaft 50, and having the flat face 54ª, and the spring arm 55 constantly bearing upon the side of the collar 54. When the wind stops and there is insufficient air movement to rotate the vanes 62, the momentum of the vanes 62 and arms 60 will be sufficient to always rotate the shaft 50 and collar 54 in contact with the curved portion of the collar 54, but will gradually decrease until insufficient to rotate the flat face 54ª past the flat spring arm 55 bearing thereagainst, so that, the spring arm 55 will bring the collar 54 and shaft 50 to a stop with the flat face 54ª of the collar in contact with the arm. The collar 54 with the flat face 54ª thereof is so positioned on shaft 50, with respect to the shutter 52, that with the arm 55 in contact with the flat face thereof, the shutter 52 lies in a position between lamp 30 and the red lens 34, so that, the lens 34 is always darkened whenever the velocity indicating means stops operation due to cessation of the wind, and hence, pilots will be advised of the fact that there is no wind in the area in which the indicator is mounted by a darkened forward lens.

The preferred form and construction of the body member 10, as illustrated herewith, is a single aluminum or similar light metal casting having the tail 14 formed integral therewith, as well as the depending shield or deflector 63 at the forward or nose end thereof, although it is to be understood that the various elements making up the indicator body may be constructed and separately and suitably joined or secured together without departing from the spirit and scope of the invention. The construction and mounting of the hinged cover 13 permits ready access to the mechanism mounted within the indicator body and for removal and replacement of the electric lamps therewithin. In closed position the cover 13 is so formed as to provide a weather proof closure for and protecting the mechanism within the body member. Preferably, all bearings are of the antifriction type to provide extremely sensitive and smooth running operation of all movable elements included in the various mechanisms making up the device of the invention.

Thus, it is apparent from the foregoing description in connection with the accompanying drawings, that the present invention provides means which will continuously and at all times, both day and night, indicate not only the direction of the prevailing winds in the area in which it is mounted, but will also indicate the velocity of such winds as well; and that the invention, by a system of visual elements, provides a method of visually imparting and informing the pilots of aircraft at considerable altitudes above the earth and for considerable distances around an area, of the direction and velocity of the prevailing ground or surface winds.

It is evident that various changes, modifications, substitutions and departures might be resorted to, as well as various other uses and applications, might be resorted to without departing from the spirit and scope of my invention and hence I do not wish to limit the invention to the exact disclosure hereof.

Desiring to protect my invention in the broadest manner legally possible, what I claim is:

1. In means for indicating the condition of the winds within an area to aircraft, an illuminating element and mechanism operated by the wind within such area for flashing said illuminating element at intervals corresponding with the velocity of the wind.

2. In means for indicating the condition of the prevailing wind within an area, a lens, a lamp for illuminating said lens, and means operated and controlled by the prevailing wind in such area adapted to be interposed between said lens and said lamp at intervals to darken said lens, the frequency of the darkened intervals of said lens dependent upon the velocity of the prevailing wind in such area.

3. In means for indicating the condition of the prevailing wind within an area, a lens, a lamp for illuminating said lens, a revolving shutter adapted to move between said lamp and lens and darken the latter, and means operated and controlled by the prevailing wind for revolving said shutter.

4. In means for indicating the condition of the wind within an area, a visible element, means for alternating rendering said element visible and invisible, and means actuated by the wind within the area for operating said means for rendering said element alternately visible and invisible at intervals proportionate to the velocity of the wind.

5. In means for indicating the condition of the prevailing wind within an area, an illuminating element, a revolving shutter for alternately darkening and exposing said illuminating element, and means actuated by the prevailing wind in such area for operating said shutter at a rate proportionate to the velocity of the wind.

6. In means for indicating the condition of the prevailing wind within an area, an illuminating element, a revolving shutter for alternately darkening and exposing said element, and a series of vanes exposed to and actuated by the wind within such area, means operated by said vanes for revolving said shutter, the rate at which said element is alternately darkened and illuminated dependent upon the velocity of the wind actuating said vanes.

7. In means for indicating the condition of the prevailing wind within an area, a body member pivotally mounted and responsive to changes in direction of the prevailing wind in such area, an illuminating element mounted on the forward portion of said body member, an illuminated element mounted on the rear portion of said body member, and means for flashing said forwardly mounted element at a rate proportionate to the velocity of the wind within such area.

8. In means for indicating the condition of the prevailing wind within an area, a direction indicating body member responsive to changes in the direction of the prevailing wind, an illuminated element mounted on the forward portion of said body member, an illuminated element mounted on the rear portion of said body member, the said forward and rear illuminated members of different and contrasting colors, and means for flashing one of said illuminated elements at a rate proportionate to the velocity of the prevailing wind.

9. In means for indicating the condition of the prevailing wind within an area, a direction indicating body member responsive to changes in the direction of the prevailing wind, an illuminating element mounted thereon, and means for flashing said element at a rate proportionate to the velocity of the prevailing wind within such area.

10. In means for indicating the condition of the prevailing wind within an area, a direction indicating body member responsive to changes in the direction of the prevailing wind and providing a top surface visible for considerable distances, illuminated elements mounted on said top surface which provides a background therefor, and means for flashing one of said illuminated elements at a rate proportionate to the velocity of the prevailing wind.

11. In means for indicating the condition of the prevailing wind within an area, a body member responsive to changes in direction of the prevailing wind and visible at considerable distances to indicate the direction thereof, an illuminated element mounted on the forward portion of said body member, an illuminated element mounted on the rear portion of said body member, and means actuated by the prevailing wind for alternately darkening and illuminating the forward element on said body member at a rate proportionate to the velocity of the prevailing wind.

12. In means for indicating the condition of the prevailing wind within an area, an elongated hollow indicator body member, a fixed vertically disposed support, said body member pivotally mounted forwardly of its center on said fixed support and swingable therearound as an axis in response to changes in the direction of the prevailing wind, a lens mounted on the top surface of said body member at the forward portion and a lens mounted on the top surface of said body member at the rear portion thereof in line with said forward lens, a lamp mounted within said body member beneath each of said lenses respectively, for illuminating the same, a revolving shutter mounted within said body member for alternately darkening and exposing said forward lamp, and means on the exterior of said body member actuated by the prevailing wind for revolving said shutter at a rate proportionate to the velocity of the wind actuating said means.

13. In means for indicating the condition of the prevailing wind within an area, an elongated hollow indicator body member, lenses mounted thereon, electrical lamps mounted within and enclosed by said body member for illuminating said lenses, a fixed vertically disposed support for said body member having a shaft fixed to and extending from the upper end in longitudinal alinement therewith, said body member provided with a depending sleeve forwardly of its center and pivotally mounted on and over said fixed shaft with said body member swingable on and around said shaft as an axis, the said shaft extending a distance within the body member and provided with electrical distributing disks fixed thereon, and brushes mounted within and carried by said body member slidable engaging said disks for movement therearound during swinging of said body member, the said disks connected with a source of electrical current and the said lamps within the body member connected with said brushes.

14. In means for indicating the condition of the prevailing wind within an area, an indicator body member, an illuminating element, a vertically disposed shaft mounted at the forward portion of said body member and extending a distance therebelow, a series of vanes extending radially from the exposed end of said shaft, a deflector depending downwardly from the forward end of said body member and extending across approximately half the path of rotation of said vanes, and means actuated by said shaft for causing said illuminating element to give an indication of the wind velocity.

15. In means for indicating the condition of the prevailing wind within an area, an illuminated element, and a revolving shutter for alternately darkening and illuminating said element, means operated by the prevailing wind within the area for revolving said shutter at a rate proportionate to the velocity of such wind, and means for causing said revolving shutter to always come to rest in position darkening said element upon cessation of the wind in the area.

16. A device for indicating to aircraft the condition of the winds within an area, comprising visible means, and mechanism controlled by the wind within the area for alternately causing said visible means to give an indication at intervals corresponding to the velocity of the wind controlling said mechanism.

17. A device for indicating the condition of the winds within an area, comprising visible means, mechanism controlled by the wind within the area for alternately causing said visible means to give an indication at intervals corresponding to the velocity of the wind controlling the said mechanism, and means for causing said visible means to always give the same predetermined indication upon nonoperation of said wind controlled mechanism due to substantial cessation of the wind within the area controlling the same.

18. A device for indicating to aircraft the condition of the winds within an arear comprising, in combination, a member visible from considerable distances and responsive to the wind to always indicate the direction thereof, and visible means mounted on said direction indicating member and controlled by the winds within the area to indicate the velocity thereof.

19. A device for indicating the condition of the winds within an area to aircraft, comprising an elongated hollow metal body member having a metal controlling surface in rearward continuation thereof, a cover hinged on said body member to provide a tight leakproof closure therefor forming the top thereof, lenses mounted in said hinged cover, illuminating means mounted within and enclosed by said body member and cover, and the said body member adapted to be pivotally mounted in horizontally disposed position for free swinging movement, around a vertical axis by the action of the winds on said controlling surface.

20. A device for indicating the condition of the winds within an area, comprising a pivotally mounted direction indicating body member controlled by the winds in the area, visible means mounted on said body member, mechanism actuated by the winds within the area for periodically rendering said visible means invisible at a rate proportionate to the velocity of the wind, and means for causing said wind actuated mechanism to become inoperative with the visible element rendered invisible when the wind is at a predetermined velocity.

21. A device for indicating the condition of the winds within an area, comprising a direction indicating body member, a visible element mounted thereon, mechanism for alternately rendering said element visible and invisible, and means actuated by the winds in the area for operating said mechanism to alternately render said element visible and invisible at a rate proportionate to the velocity of the wind.

22. A device for indicating the condition of the winds in an area, comprising a direction indicating body member, a visible element mounted thereon, mechanism for alternately rendering said element visible and invisible, and a wind wheel mounted on said body member and actuated by the winds in the area adapted to operate said mechanism to alternately render said element visible and invisible at a rate proportionate to the velocity of the wind.

23. A device for indicating the condition of the winds in an area, comprising a direction indicator controlled by the winds in the area, signalling means mounted thereon, and mechanism actuated by the winds in the area adapted to continuously and automatically operate said signal means to indicate to aircraft the approximate velocity of the wind in the area.

ALEXANDER A. PEDU.